US008706290B2

(12) United States Patent
Zettler

(10) Patent No.: US 8,706,290 B2
(45) Date of Patent: Apr. 22, 2014

(54) METHOD AND FACILITY FOR TRANSPORTING BULK CONSIGNMENTS

(75) Inventor: Michael Zettler, Allensbach (DE)

(73) Assignee: Siemens Aktiengesellschaft, Munich (DE)

( * ) Notice: Subject to any disclaimer, the term of this patent is extended or adjusted under 35 U.S.C. 154(b) by 1146 days.

(21) Appl. No.: 12/214,960

(22) Filed: Jun. 24, 2008

(65) Prior Publication Data

US 2009/0045105 A1 Feb. 19, 2009

(30) Foreign Application Priority Data

Aug. 13, 2007 (DE) ......................... 10 2007 038 186
May 30, 2008 (DE) ......................... 10 2008 026 088

(51) Int. Cl.
*G06K 9/36* (2006.01)

(52) U.S. Cl.
USPC ............. 700/219; 700/224; 705/60; 705/402; 705/24; 382/101; 209/534; 209/577

(58) Field of Classification Search
USPC .......................................................... 700/219
See application file for complete search history.

(56) References Cited

U.S. PATENT DOCUMENTS

| | | | | |
|---|---|---|---|---|
| 5,675,650 | A * | 10/1997 | Cordery et al. | 705/60 |
| 6,266,431 | B1 | 7/2001 | Kiyono | |
| 6,269,171 | B1 * | 7/2001 | Gozzo et al. | 382/101 |
| 6,826,446 | B1 | 11/2004 | Volta | |
| 6,888,084 | B1 | 5/2005 | Bayer | |
| 7,415,130 | B1 | 8/2008 | Rundle et al. | |
| 7,974,882 | B1 * | 7/2011 | Shada et al. | 705/24 |
| 2002/0029202 | A1 * | 3/2002 | Lopez | 705/406 |
| 2003/0182017 | A1 * | 9/2003 | O'Donohue et al. | 700/224 |
| 2004/0073522 | A1 * | 4/2004 | Rozendaal et al. | 705/402 |

(Continued)

FOREIGN PATENT DOCUMENTS

| | | | |
|---|---|---|---|
| AU | 2005/203141 | A1 | 9/2006 |
| DE | 40 00 603 | C2 | 7/1991 |

(Continued)

OTHER PUBLICATIONS

Derwent Abstract—EP 1 622 065 A1; Feb. 1, 2006; Solystic, F-94257 Gentilly Cedex, France.

(Continued)

*Primary Examiner* — Gene Crawford
*Assistant Examiner* — Kyle Logan
(74) *Attorney, Agent, or Firm* — Laurence A. Greenberg; Werner H. Stemer; Ralph E. Locher

(57) ABSTRACT

A method for transporting a set of items includes predetermining a destination point for each item of the set and for each further item which passes through the sorting system, generating for each item a current image of the item from a predetermined viewing direction, determining the predetermined destination point of the item, and initiating a transport of the item to the destination point. The method includes further transmitting a computer-readable description of the set to a data processing system which is connected to the sorting system. The description includes a reference image of the item from the viewing direction. For each item which passes through the sorting system, the method includes automatically deciding by the data processing system whether or not the item belongs to the set, wherein the data processing system compares the generated current image of the item with the reference image.

21 Claims, 1 Drawing Sheet

(56) References Cited

U.S. PATENT DOCUMENTS

| | | | | |
|---|---|---|---|---|
| 2004/0218783 | A1* | 11/2004 | Mampe et al. | 382/101 |
| 2006/0080266 | A1* | 4/2006 | Kiani et al. | 705/402 |
| 2007/0000818 | A1* | 1/2007 | Delitz et al. | 209/534 |
| 2008/0149540 | A1 | 6/2008 | Olivier et al. | |
| 2008/0264835 | A1* | 10/2008 | Bayer | 209/577 |

FOREIGN PATENT DOCUMENTS

| | | | |
|---|---|---|---|
| EP | 0938066 | A2 | 8/1999 |
| EP | 1 622 065 | A1 | 2/2006 |
| EP | 1232024 | B1 | 4/2006 |
| EP | 0 741 374 | B1 | 7/2006 |
| EP | 0 741 375 | B1 | 7/2006 |
| WO | WO 2006/100357 | A1 | 9/2006 |
| WO | 2007022879 | A1 | 3/2007 |

OTHER PUBLICATIONS

Derwent Abstract—WO2006/100337 A1; Sep. 28, 2006; Solystic, F-94257 Gentilly Cedex, France.

Derwent Abstract—DE 40 00 603 C2; Jul. 18, 1991; Siemens AG, D-80333 Munich, Germany.

* cited by examiner

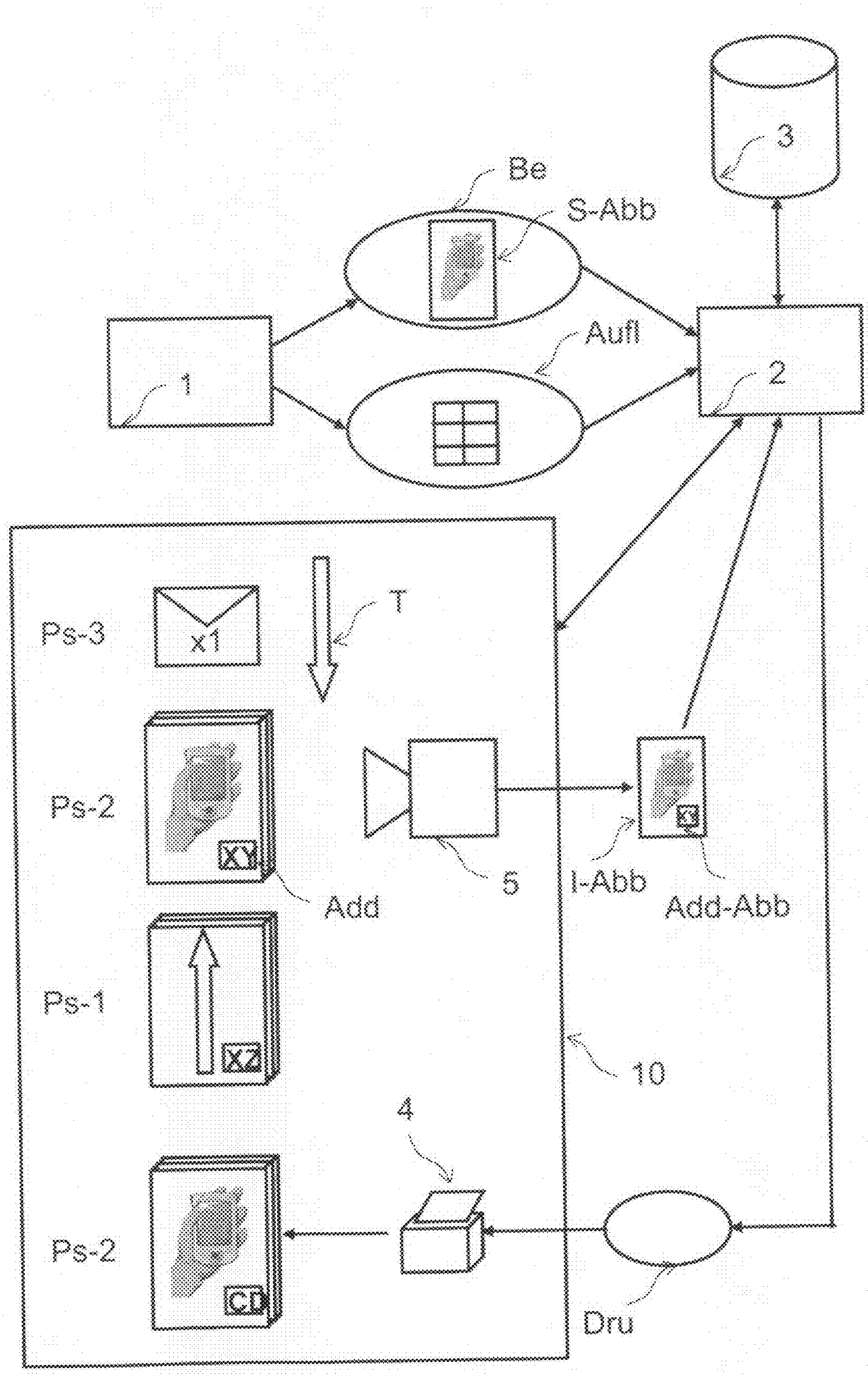
3
Be
S-Abb
Aufl
1
2
T
Ps-3
x1
Ps-2
XY
Add
5
I-Abb
Add-Abb
Ps-1
XZ
10
4
Ps-2
CD
Dru

METHOD AND FACILITY FOR TRANSPORTING BULK CONSIGNMENTS

CROSS REFERENCE TO RELATED APPLICATIONS

This application claims priority of German application No. 10 2007 038 186.9 DE filed Aug. 13, 2007 and to German application No. 10 2008 026 088.6 DE file May 30, 2008, both of which are incorporated by reference herein in their entirety.

BACKGROUND OF THE INVENTION

The invention relates to a method and a facility for transporting similar items, in particular bulk postal consignments.

EP 741374 B1 describes a method by means of which a consignor can dispatch a batch of postal consignments via a transporter. The consignor adds an encrypted franking stamp ("encrypted indicia") to each postal consignment of the batch and posts the batch together with a description ("mail documentation file") of the batch, preferably in electronic form. This description contains an indicator code for the total weight of the batch. The transporter checks this indicator code.

This method is adapted in EP 741375 B1. The description that is sent ("statement of mailing") is equipped with a digital signature. The arrival of the description in a "transaction processing center" initiates a money transfer which pays for the transport.

In DE 102005040664 A1 several batches of mail items are sent to a postal sorting machine. Every batch consists of similar advertising mail items. From every batch ten exemplary images of mail items from the batch are taken. Using these ten images, a representative image of the batch is generated by means of averaging the ten images, e.g. To process a mail item, its current image is compared with the respective representative image of every batch.

EP 1622065 A1 and AU 2005203141 A1 propose automatically identifying groups of similar postal consignments among all the postal consignments that are processed in a system. For this, the sorting system generates an image of each postal consignment to be processed and compares these images with each other.

The method described in EP 1232024 B1 and U.S. Pat. No. 6,826,446 B1 presupposes that each postal consignment is equipped with a machine-readable code, e.g., a bar code.

In the case of the method disclosed in WO 2006100357 A1, each postal consignment passes through a sorting system twice. An image of the surface of the postal consignment is generated as part of both passes. In the second pass, each generated image of a postal consignment is individually compared with the images that were generated and temporarily stored as part of the first pass.

U.S. Pat. No. 6,768,810 B2 describes a method for funding areas with delivery information on the surfaces of mail items. A digital image of the surface of every mail item is created. This image comprehends the delivery information. The digital image is transmitted to an optical character recognition (OCR) unit for automatically processing it. If it is not possible to identify the entire area with the delivery information, the entire image is sent to a unit for video coding.

SUMMARY OF THE INVENTION

The invention addresses the problem of processing a set of similar items tog ether with other items by means of a sorting system, and automatically recognizing which items belong to the set without information about the assignment to the set having to be printed on the similar items.

Accordingly, one aspect involves a method for transporting a set of items, which includes predetermining a destination point for each item of the set and for each further item which passes through the sorting system, generating for each item a current image of the item from a predetermined viewing direction, determining the predetermined destination point of the item, and initiating a transport of the item to the destination point. The method includes further transmitting a computer-readable description of the set from a data processing system of a consignor to a data processing system which is connected to the sorting system. The description includes a reference image of the item from the viewing direction. For each item which passes through the sorting system, the method includes automatically deciding by the data processing system whether or not the item belongs to the set, wherein the data processing system compares the generated current image of the item with the reference image.

Another aspect involves a facility for transporting a set of items, wherein a destination point is predetermined in each case for each item of the set. The facility includes a sorting system and a data processing system. The sorting system is configured to transport each item of the set through the sorting system, to generate a current image of an item which is transported through the sorting system from a predetermined viewing direction, to identify the predetermined destination point of the item, and to initiate transport of the item to the destination point that has been identified. The data processing system is coupled to the sorting system and includes a data memory in which a computer-readable description of the item set is storable. The data processing system is connected or connectable to a further data processing system of a consignor for obtaining the computer-readable description and installed to store the description in the data memory. The description includes a reference image of the item from the viewing direction, wherein the reference image is valid for each item of the set. The data processing system is configured to automatically decide, for an item which passes through the sorting system, whether the item belongs to the set or not, and to compare the generated current image of the item with the reference image.

A set of items is transported to destination points. This set can consist of a single item or a plurality of similar items. It is possible that each item is transported to a different destination point. It is also possible that a plurality of items of the set are transported to the same destination point.

Each item of the set passes through a sorting system at least once. It is possible that other items which do not belong to the set likewise pass through this sorting system. For each item that passes through the sorting system, the destination point to which this item must be transported is predetermined. The destination point is predetermined by virtue of the fact that the item is equipped with a specification of the destination point, and/or by virtue of the fact that the destination point is stored in a data memory which is read out by the sorting system.

The sorting system generates a current image in each case of each item that passes through the sorting system. This current image shows the item from a specific viewing direction.

The sorting system identifies the respective destination point of each item which passes through the sorting system. For this, it analyzes the current image and/or the data record. The sorting system then initiates a transport, of each item which is passing through, to the destination point that has been identified.

The sorting system is connected to a data processing system or includes a data processing system. According to the invention, a computer-readable description of the set is sent to the data processing system. This description includes a reference image of the item from the predetermined viewing direction, said reference image being valid for each item of the set.

For each item which passes through the sorting system, the data processing system automatically decides whether the item belongs to the set or not. For this decision, the data processing system compares the current image of the item with the reference image that was sent.

An advantage of the invention is as follows: while the items of the set are transported, their transport can be monitored and tracked without each item having to be assigned an individual code that distinguishes the item from all other items being transported at the same time. Such an individual code often requires a large amount of space on the item or disfigures it.

Furthermore, no item need bear information indicating that the item belongs to the set. Instead, the assignment to the set is recognized by the sorting system automatically by comparing the predetermined reference image with the current image that is determined.

A further advantage of the invention is that it saves the need for sending at least one item through the sorting system for creating the reference image. Rather the reference image is available as soon as the computer-readable description is transmitted to the data processing system connected to the sorting system and is evaluated.

In one embodiment the reference image is created by using an artwork master. This artwork master is used or usable for creating a cover sheet with which every item of the set is provided with and which is visible from outside, the cover sheet of a catalogue, e.g. This embodiment saves the need to perform a dedicated step for creating the reference image. Rather the artwork master is used for creating the cover sheer and is re-used for creating the reference image.

In an embodiment, each item of the set is equipped with an indicator code of a destination point before it passes through a sorting system for the first time, e.g., by virtue of being labeled with the indicator code. The sorting system reads this indicator code and thus determines the destination point. A computer-readable listing is sent to the data processing system and includes those destination points to which the items must be transported. The sorting system utilizes this listing in order to validate and check the destination addresses that have been read. In particular, it utilizes the listing in order to resolve ambiguities when reading.

An advantage of this embodiment is that the listing includes far fewer destination points than an address database containing all addresses of a specific area.

In a further embodiment, the sorting system itself equips the items with an indicator code of the destination point. This embodiment saves a consignor from having to equip the items with the destination points in advance, and saves the sorting system from having to read a destination point. The items are instead supplied to the sorting system without destination point indicator codes. A computer-readable listing containing reference destination points is sent to the data processing system. At least one item of the set must be transported to each of these reference destination points in each case. The sorting system analyzes the listing and selects a reference destination point anew from the listing in each case. It equips an item of the set with an indicator code of the selected reference destination point. This indicator code is utilized for the purpose of transporting the item to the reference destination point.

This embodiment of the invention eliminates the requirement to supply the items of the set to the sorting system separately from other items. Instead, the sorting system automatically recognizes that an item passing through belongs to the set and must be automatically equipped with an indicator code of a reference destination point from the listing. A mixed supply is therefore possible.

The invention can be applied to the transport of postal consignments, e.g., letters or catalogs. Each postal consignment must be transported to a predetermined delivery address in each case. The postal consignments can also be in-house postal consignments which must be dispatched within a geographically distributed enterprise. In this application, the delivery addresses comprise addresses of sites of the enterprise.

The items to be transported can also be packages of travelers or freight goods. Each package must be transported to an airport or to a train station or port or other destination point. A package forwarding center determines which package must be transported to which destination location. The packages of the set require, e.g., similar handling and are visually similar.

The invention can also be utilized for the internal materials flow within a manufacturing installation. The sorting system transports different types of components to a production line on which, e.g., cars are manufactured. Each component must be transported to a specific location of the production line in order to be installed in a chassis, for example.

The invention is applied to a component type which must be transported, e.g., in a specific manner. Or the components of this type have not yet been equipped with an indicator code for their relevant delivery point before they pass through the sorting system, and are equipped with such an indicator code for the first time in the sorting system. By virtue of the invention, these components are distinguished from other types of components.

BRIEF DESCRIPTION OF THE SEVERAL VIEWS OF THE DRAWINGS

The novel features and method steps characteristic of the invention are set out in the claims below. The invention itself, however, as well as other features and advantages thereof, are best understood by reference to the detailed description, which follows, when read in conjunction with the accompanying drawing, which shows an arrangement in which an embodiment of the inventive method is realized.

DETAILED DESCRIPTION OF THE INVENTION

In the exemplary embodiment, the items which must be transported are postal consignments. Predetermined delivery addresses, which are added to the postal consignments before or during the transport, function as destination points of the items. A delivery address can be, e.g., a natural person with a residential address, an enterprise or a P.O. box.

The invention is utilized for the purpose of dispatching a batch comprising many similar postal consignments, e.g., many copies of a journal or a catalog, to different recipients. The individual postal consignments differ by virtue of the different delivery addresses, but not by virtue of their weight or dimensions. The delivery address of a postal consignment preferably comprises the name of the recipient (a natural or a legal person), street and house number or P.O box, town and postal code or “ZIP code”, and if necessary an indicator code for the country or delivery region.

A consignor transports the similar postal consignments to a transporter, e.g., to a postal enterprise or other logistics service provider. This transporter delivers each of the postal consignments of the batch to its respective addressee. In order to distinguish the similar postal consignments from other postal consignments, the similar postal consignments of the batch are subsequently referred to as "bulk postal consignments".

The bulk postal consignments of the batch have similar cover sheets which are externally visible during the processing. For example, each bulk postal consignment is sealed and the binding or the envelope of the postal consignment functions as the cover sheet. In the case of a journal, the externally visible first page functions as a cover sheet. It is also possible, specifically for the transport, for the journal or the catalog to be supplemented by an address cover sheet which includes a logo of the consignor and/or a logo of the journal and does not belong to the journal or to the catalog and then functions as the cover sheet.

In an embodiment of the invention, the relevant delivery address of each bulk postal consignment is printed or stamped in a specific area on each cover sheet. This area is subsequently referred to as an address block field Further information can be entered in the address block fields, e.g., the customer number of the addressee relative to the consignor, a customer number of the consignor relative to the transporter and/or an anticipatory disposal ("endorsement"). However, the entry of additional information is not required for the bulk postal consignments of the batch.

An effect of an advantageous embodiment of the invention is that it eliminates the requirement to print anticipatory disposals and quality requirements on the bulk postal consignments of the batch. An anticipatory disposal ("endorsement") is used by the consignor for the purpose of specifying what the transporter is to do with a postal consignment which cannot be delivered to the predetermined delivery address. Possible anticipatory disposals which the transporter offers and from which the consignor selects are, e.g., returning to the consignor, forwarding to another delivery address, e.g., a P.O. box or a box in a parcel box center, or destroying the postal consignment. A return address, e.g., an address of the publisher, must be specified for the return. This return address is often displayed inside a publication. Therefore a sorting system cannot recognize it externally.

A quality requirement ("quality of service") is used by the consignor for the purpose of specifying which quality conditions are to be observed by the transporter during the transport of the postal consignment. Examples of quality requirements are the transport "by air mail", as "1 st class mail", as "2 nd class mail" and delivery to the recipient at the latest n days after posting.

It is possible for the consignor to specify anticipatory disposals and/or quality requirements which apply to all postal consignments of the batch. The return address for non-deliverable copies, e.g., of a journal is an example of such a standard anticipatory disposal. Additionally or alternatively, the consignor can also specify individual anticipatory disposals and/or quality requirements for individual postal consignments, e.g., for postal consignments to specific people or specific delivery areas.

In the exemplary embodiment, the consignor additionally sends a computer-readable listing to the transporter. This listing contains individual specifications which only apply to one or several bulk postal consignments in each case, while the specifications in the description apply to all bulk postal consignments. The listing contains data records comprising in each case a delivery address and at least one specification for the bulk postal consignment to this delivery address.

The consignor preferably sends this listing to the transporter via electronic means, e.g., by means of a data processing system via the Internet and preferably via a secure data line and in encrypted form, e.g., equipped with a digital signature. For example, the consignor sends a table or database, which contains a data record in each case for some or all delivery addresses of the batch, to the transporter (i.e., to a data processing system of the transporter).

The consignor preferably sends individual anticipatory disposals and quality requirements to a data processing system of the transporter by means of these individual specifications being included in the listing. If an individual anticipatory disposal or quality requirement has been specified for a postal consignment to a specific delivery address, the data record for this delivery address contains an indicator code for this anticipatory disposal or quality requirement. It is possible for both an anticipatory disposal and a quality requirement to be specified for the same delivery address.

This table or database can also store further information which is specific to an individual delivery address, e.g., address changes, which only became known to the consignor after the delivery address was printed, and customer numbers.

It is also possible that the listing contains data records which are only for individual delivery addresses in each case, e.g., only for delivery addresses having individual anticipatory disposals ("endorsements") and/or quality requirements. The listing preferably also contains details relating to the quantity of bulk postal consignments in the batch.

FIG. 1 shows an arrangement in which an embodiment of the inventive method is realized. A data processing system 1 of the consignor sends the computer-readable description Be and the computer-readable listing Aufl to a data processing system 2 of the transporter, said data processing system being situated, e.g., in the first sorting center. The data processing system 2 of the transporter is connected to a central database 3. The description Be contains a reference image S-Abb of the bulk postal consignments of the batch.

The consignor posts a batch comprising addressed bulk postal consignments. A stream of postal consignments passes through a first sorting system 10 in a transport direction T. FIG. 1 shows a first postal consignment Ps-1 in the form of a letter, a bulk postal consignment Ps-2 of the batch and a further bulk postal consignment Ps-3 which does not however belong to this batch. A camera 5 of the sorting system 10 generates a current image of each postal consignment, inter alia the current image I-Abb of the bulk postal consignment Ps-2 of the batch. This current image I-Abb contains an image Add-Abb of the delivery address Add of Ps-2. The reference image S-Abb does not contain a delivery address.

The data processing system 2 of the transporter identifies the reference image S-Abb by means of read access to the central database 3, and decides that the postal consignment Ps-1 is a bulk postal consignment of the batch. In a corresponding manner, data processing system 2 decides that the postal consignments Ps-1 and Ps-3 do not originate from the batch. As a result of analyzing the current image I-Abb, the data processing system 2 also ascertains the delivery address Add of Ps-2. In the listing Aufl from the consignor, an anticipatory disposal, specifically a new delivery address, is stored for this delivery address Add. The data processing system 2 generates a print instruction Dru and sends this print instruction to a printer 4 of the sorting system 10. The printer 4 prints the new delivery address on the postal consignment Ps-2.

In another embodiment, the cover sheets are not equipped with delivery addresses. For example, no address block field is provided. This other embodiment is used, e.g., in order to scatter advertising consignments widely but without sending such an advertising consignment to every household in a specific delivery area. This other embodiment is also used if the consignor wants to have a catalog or journal dispatched to registered customers and wants to eliminate the step of locally equipping these catalogs/journals with the delivery addresses. The consignor sends the transporter the unprinted postal consignments and the above described listing including those delivery addresses which are to receive the bulk postal consignments.

In an embodiment, the listing is sent from a data processing system of the consignor to the data processing system of the transporter. The bulk postal consignments themselves are conveyed from a print shop to the transporter, i.e., independently of the listing.

The invention enables the transporter to allow the bulk postal consignments of the batch, which are not yet equipped with a delivery address, to be processed and pass through a sorting system together with other postal consignments. Special handling for the bulk postal consignments of the batch is not required. As a result of the cover sheet, the bulk postal consignments are automatically recognized and therefore the sorting system can equip them with delivery addresses.

According to the invention, the consignor also sends the transporter a computer-readable description of the bulk postal consignments of the batch. This description comprises information which is common to all bulk postal consignments of the batch. In particular, this includes an electronic image of the cover sheet of each bulk postal consignment, said image being subsequently referred to as a reference image. The current image of a bulk postal consignment of the batch can vary from this reference image, e.g., due to tolerances during the printing process. This description can contain further information which is valid for all bulk postal consignments of the batch, e.g., standard anticipatory disposals which apply if no individual anticipatory disposal is specified for a postal consignment.

This reference image preferably includes an indicator code for the position and the dimensions of the address block field. The address block field itself is preferably empty in the reference image. Consequently, the reference image is valid for each of the many similar bulk postal consignments of the batch and is therefore a generic image. This reference image can include a logo of the consignor and/or the logo of a journal or catalog.

In an embodiment, the consignor utilizes an electronic artwork master, on the basis of which the cover sheet is printed, in addition to generating the reference image. For example, the consignor sends the artwork master directly to the data processing system of the transporter as part of the description. Alternatively, a data processing system of the consignor generates the reference image from the artwork master by generating a simplified copy using less storage space.

The image is preferably a file in a format for describing graphics, e.g., bitmap, Portable Document Format (PDF), a vector graphics format, JPG or Tag Image File (TIF) format.

In the exemplary embodiment, the computer-readable description additionally includes an identification code of the consignor of the batch as well as generic anticipatory disposals ("endorsements") and quality requirements, i.e., those specifications of the consignor which apply to each postal consignment of the batch. For example, the computer-readable description contains the specification that each postal consignment must reach the recipient (i.e., the delivery address) after no more than n days of transport and then, if it cannot be delivered, must be returned to the consignor.

The identification code can be used such that the sorting system automatically recognizes the consignor of a bulk postal consignment which is passing through, without having to search the current image of this postal consignment for a sender address or a logo of the consignor.

Furthermore, the computer-readable description additionally includes a standard substitute delivery address. A bulk postal consignment must be transported to this standard substitute delivery address in the event that it cannot be transported to the predetermined delivery address and if an anticipatory disposal does not specify an alternative handling of the bulk postal consignment. The standard substitute delivery address can be the address of the consignor to whom the bulk postal consignment is returned, or otherwise an address which is predetermined by the consignor. The identification code of the consignor can be assigned a return address to which an undeliverable bulk postal consignment of the batch is to be returned.

In an embodiment, each bulk postal consignment of the batch passes at least twice through a sorting center which includes a sorting system. The postal consignment firstly passes through that sorting center which processes all machine-processable postal consignments from the posting location. The sorting system in this first sorting center determines the delivery address of each bulk postal consignment. For example, the first sorting system 10 reads the delivery address which is printed or stamped onto the cover sheet. The determined delivery address is temporarily stored.

The first sorting system 10 preferably validates the address which has been read. For this, the first sorting system 10 reads the above cited computer-readable listing Aufl which includes delivery addresses. This listing contains a delivery address for each bulk postal consignment of the batch. The first sorting system 10 compares the read address of a bulk postal consignment with the addresses in the listing. As a result of the comparison, the first sorting system 10 resolves, e.g., ambiguities which remain after reading the delivery address.

Depending on the recognized delivery address, the postal consignment is transferred out to an output entity of the first sorting system 10 and transported to that second sorting center which is responsible for the delivery area of the delivery address. The second sorting center can be identical to the first sorting center. The second sorting system in the second sorting center determines the temporarily stored address of a postal consignment and forwards the postal consignment to the relevant delivery address. The second sorting system preferably transfers each postal consignment out to an output box which is reserved for postal consignments to one or more predetermined delivery addresses.

The bulk postal consignments of the batch are processed together with other postal consignments in both sorting centers. The sorting centers utilize the computer-readable description including the image for the purpose of distinguishing the similar bulk postal consignments from other postal consignments that must be processed.

In another embodiment, the bulk postal consignments of the batch only pass through a sorting center including a sorting system once. In this embodiment, the postal consignments are presorted and all postal consignments of the batch are transported to delivery addresses in that delivery area for which the sorting center is responsible. It is possible for the similar bulk postal consignments to be divided into a plurality of batches in advance during the presorting, specifically into one batch per delivery area in each case.

All sorting systems of the transporter are preferably connected to a central database. The reference image is stored in this central database. As a result, each sorting system has read access to the description and in particular to the reference image. Duplicate data storage is avoided.

In another embodiment, the reference image of the cover sheet is sent to each sorting center. The computer-readable listing including the delivery addresses is preferably likewise sent to the central database or to all sorting centers.

A check preferably automatically establishes beforehand whether the sent reference image is sufficient for the purpose of differentiating the bulk postal consignments from other postal consignments which the transporter transports. For this, the sent reference image is compared with stored images of other postal consignments or cover sheets of other batches. An attribute vector of the sent image is compared in each case with an attribute vector of each other stored image. The separation between these two attribute vectors is calculated. If the separation is large enough, the bulk postal consignments of the batch can be distinguished from other postal consignments.

In the first sorting center, for each postal consignment which must be processed, a check automatically establishes whether this postal consignment is one of the bulk postal consignments of the batch or another postal consignment. The computer-readable description which the consignor sent to the transporter is utilized for this purpose.

In an embodiment the length and the thickness of the postal consignment that is to be processed are measured at least approximately. The measured length and thickness are compared with the sent dimensions. If the measured length or thickness differs from the sent dimensions by more than a predetermined limit, the postal consignment that is to be processed does not belong to the bulk postal consignments of the batch. It is possible additionally to measure the weight of the postal consignment at least approximately and to compare said weight with details in the description. This embodiment makes it possible to restrict the time-intensive comparison between current image and reference image for some of the postal consignments passing through.

The weight and in particular the dimensions of the postal consignments are frequently determined in any case in order that the first sorting system 10 can process the postal consignments, and particularly if the first sorting system 10 processes postal consignments of differing sizes or weights in an unpredictable order.

In the first sorting system 10, an electronic current image is generated of that surface of the postal consignment to be processed which bears the delivery address. For example, the surface is photographed by one or more cameras.

It is possible for the postal consignment initially to be photographed or scanned from a plurality of sides, i.e., from a plurality of viewing directions. A plurality of current images is therefore generated. That current image which includes the delivery address or at least a delivery address field for the delivery address is determined automatically. This is required in particular during the transport of a parcel. Letters and postcards also have two surfaces on which a delivery address can be present.

This current image is compared with the reference image which the consignor sent to the transporter. If a plurality of reference images for different batches were sent to the transporter, the current image is compared with each of these reference images.

The current image of the postal consignment to be processed normally bears a delivery address. The latest time at which a postal consignment must actually bear a delivery address that can be read by a person is when a delivery person is to deliver this postal consignment. However, the reference image sent by the consignor does not have a delivery address because the bulk postal consignments of the batch must normally be transported to different delivery addresses. The delivery address must therefore be extracted before the comparison of a current image with the reference image.

In an embodiment, the sent description includes an indicator code for the position and the dimensions of the delivery address field. This indicator code is used by the first sorting system 10 in order to determine where the delivery address is located in the current image, in order to extract this delivery address from the current image before the comparison between reference image and current image.

In another embodiment, the first sorting system 10 automatically determines where the delivery address is located (determining the "region of interest") by analyzing the current image without the sent description necessarily including an indicator code for the position or for dimensions of the delivery address field.

In both embodiments, the first sorting system 10 extracts the address block field including the delivery address from the current image that is captured. The computer-readable current image—with extracted delivery address field—is compared with the sent computer-readable reference image.

There follows a description of the way in which the current image is compared with the predetermined reference image.

An attribute vector is preferably calculated in each case from both images. Each attribute vector includes attribute values of characteristic attributes of the respective image, e.g., the frequency and the spatial distribution of gray tones and color tones and the distribution of luminosity intensities, position and size of the delivery address field. A grid is preferably placed over the relevant image. For each cell of the grid, the number of pixels having specific properties in the grid cell is counted. The field containing the delivery address is not taken into consideration in this context, e.g., because the grid does not cover the delivery address field.

Using the current image which has been captured—after the delivery address has been extracted—the first sorting system 10 generates a current attribute vector which describes the current image of the surface without delivery address. This attribute vector is subsequently referred to as "reduced current attribute vector". A reference attribute vector which describes the reference image using values for the same attributes is also calculated.

The two attribute vectors are automatically compared with each other. A separation between the two attribute vectors is preferably calculated in a suitable attribute range. If the separation exceeds a predetermined limit, the two images originate from different postal consignments and the postal consignment to be processed does not belong to the bulk postal consignments of the batch. In the case of a separation which is smaller than or equal to the limit, the first sorting system 10 automatically decides that the postal consignment to be processed belongs to the bulk postal consignments of the batch.

The reference attribute vector of the sent reference image is preferably calculated once in advance and, e.g., stored in the central database or in each sorting system. This is because this reference attribute vector is re-used for each comparison. By contrast, the current attribute vector and the reduced current attribute vector for a postal consignment that is to be processed are calculated when this postal consignment passes through a sorting system. It depends on the current image of this postal consignment.

In an alternative embodiment, the decision whether the postal consignment that is to be processed is one of the bulk postal consignments of the batch is taken exclusively by comparing the current image with the reference image, i.e., without comparing the dimensions or the weight.

There follows a description of the steps which are carried out if the postal consignment that is to be processed belongs to the batch with the bulk postal consignments.

As mentioned above, the first sorting system 10 determines the delivery address of each postal consignment that is to be processed. In an embodiment, the consignor sends the transporter a computer-readable listing including the delivery addresses for the bulk postal consignment. The first sorting system 10 has read access to this listing, e.g., because the listing is also stored in the central database. The first sorting system 10 analyzes the listing in order to identify the delivery address or to check an identification result.

In particular, the first sorting system 10 overcomes ambiguities which remain after reading the delivery address. If a postal consignment that is to be processed originates from the batch, the first sorting system 10 checks whether the identified delivery address is contained in the listing which includes the delivery addresses. If this is not the case, a read error has occurred or the sent listing is incomplete or otherwise erroneous.

The first sorting system 10 identifies quality requirements which are predetermined for individual or all postal consignments of the batch. As soon as it is recognized that a postal consignment belongs to the batch, the first sorting system 10 preferably first analyzes the sent description of the batch and checks whether quality requirements have been predetermined which apply to all consignments of the batch. If the first sorting system 10 finds such a quality requirement in the description, it implements this quality requirement. For example, it initiates an immediate onward transport if a quality requirement has been specified that the postal consignment must be delivered on the day after posting ("E+1", "1st class mail"). However, if the transport is allowed to take up to five days, for example, the first sorting system 10 preferably initiates an intermediate storage of the postal consignment in order to transport the postal consignment cost-effectively together with many other postal consignments, including those postal consignments which only arrive at the first sorting system 10 on the next day.

After the first sorting system 10 has additionally read the delivery address of a postal consignment of the batch, it searches through the listing for individual quality requirements. To this end, it searches in the listing for a data record which includes the delivery address that has been read. If such a data record is found, the first sorting system 10 checks whether this data record contains an individual quality requirement and initiates a transport of the postal consignment in accordance with the individual quality requirement. It is not necessary for the consignor to print a quality requirement on the postal consignment and for the second sorting system to read this quality requirement.

If a data record including the delivery address is found in the listing, the first sorting system 10 additionally checks whether the data record contains an update or correction of the delivery address. For example, the recipient has moved and placed a forwarding request. Or the recipient is away and has instructed that all postal consignments are to be stored temporarily in a P.O. box for a specific period. Or the recipient has instructed that all postal consignments bearing the recipient's address are to be sent to a P.O. box. The first sorting system 10 determines the correct delivery address in the data record and initiates a transport to the corrected delivery address. The first sorting system 10 preferably prints the corrected delivery address on the postal consignment, e.g., by printing a label featuring the corrected delivery address and sticking the label over the old delivery address.

Provision is also made for the possibility that the postal consignment passes through a sorting system for the third time, specifically because is could not be delivered to the delivery address after the first two passes and is therefore being transported onwards in accordance with an anticipatory disposal. Such an anticipatory disposal therefore comes into effect if the postal consignment was transported to the predetermined delivery address and it was established there that the postal consignment could not be delivered to this delivery address. This is usually established by a delivery person. For example, the recipient has moved and has not placed a forwarding request. Or the forwarding request is no longer effective. The postal consignment is equipped with a stamp to the effect that it cannot be delivered to the delivery address and is conveyed back to a sorting system. This sorting system initiates a transport in accordance with the anticipatory disposal. It is therefore possible for a postal consignment which passes through the first sorting system 10 to be transported not to the delivery address that is printed thereon, but to, e.g., the consignor or to a third party in accordance with an anticipatory disposal.

Thanks to the invention, the return address to which the postal consignment is to be returned does not have to be printed on the postal consignment. Instead, the sorting system determines the return address by analyzing the computer-readable description. This can contain the return address in addition to the reference image.

The first sorting system 10 initially checks whether a stamp relating to a non-deliverability is printed on the postal consignment. If this is the case, the sorting system searches in the description for a generic anticipatory disposal for all postal consignments of the batch. After the address has been read, it also searches in the listing for an individual anticipatory disposal for this delivery address.

If neither an individual nor a generic anticipatory disposal is found, the first sorting system 10 preferably applies a stored rule which is valid for all postal consignments that are transported by this transporter. This rule specifies what the sorting system is to do with a non-deliverable postal consignment. The handling of the postal consignment can depend on the predetermined individual or generic quality requirement. For example, "1st class mail items" are returned to the predetermined return address and all other postal consignments are destroyed.

Thanks to the invention, it is not necessary for the first sorting system 10 to search for anticipatory disposals in the current image of this postal consignment. This reduces the risk of errors when analyzing the current image. In particular, if the current image is searched for information relating to anticipatory disposals, the first sorting system 10 would not be able automatically to decide, with an adequate degree of certainty, that the current image does not contain an anticipatory disposal and that a rule of the transporter should therefore be applied. The invention provides a method which reduces the risk of errors and offers this certainty: if neither the description contains a generic anticipatory disposal nor the listing contains an individual anticipatory disposal, the rule of the transporter will be applied.

As explained above, in an embodiment the consignor sends the bulk postal consignments without a printed delivery address to the transporter. The transporter determines the delivery addresses exclusively on the basis of the listing that is sent.

In this embodiment, solely the listing specifies delivery addresses to which the bulk postal consignments are to be transported. The bulk postal consignments are supplied to the first sorting system 10 without being equipped with delivery addresses, e.g., together with other postal consignments. The data processing system of the sorting center has read access to this listing comprising the delivery addresses. As soon as the data processing system detects that a bulk postal consignment of the batch is passing through the sorting system, it selects a data record including a delivery address in the listing. It sends this selected delivery address to the first sorting system 10. The first sorting system 10 equips the bulk postal consignment of the batch with an indicator code of the selected delivery address. Only thus is this bulk postal consignment distinguishable from the other bulk postal consignments of the batch.

The first sorting system 10 preferably prints the relevant delivery address in the address block field of the postal consignment that is to be processed, said postal consignment being distinguishable only thus from other bulk postal consignments of the batch. In an embodiment, the sent description contains a specification of the address block field in addition to the reference image. This specification is valid for all bulk postal consignments of the batch. The first sorting system 10 therefore "knows" where the delivery address must be printed and how much space is available.

It is also possible for the first sorting system 10 to print the delivery address and any anticipatory disposals together with the sent reference image on a suitable sheet and to combine the postal consignment which does not have an delivery address with this sheet to form a new postal consignment having a delivery address. This sheet functions as the cover sheet, and the postal consignment can be identified as part of the batch by virtue of this cover sheet.

In a variant of the embodiment, exactly one bulk postal consignment of the batch is sent to each delivery address of the listing. The listing can contain a plurality of matching delivery addresses. After the data processing system has selected a delivery address from the listing and sent it to the sorting system, the data processing system locks this delivery address against being selected again. This prevents two bulk postal consignments of the batch from being transported to the same delivery address.

In another variant, in addition to a delivery address in each case, each data record—or at least some data records—in the listing additionally contains the reference quantity of the bulk postal consignments to be transported to this delivery address. For example, according to the listing a library receives five copies of a journal or a furniture store receives three copies of a catalog. For each data record in the listing, the data processing system registers how many bulk postal consignments are equipped with an indicator code of the delivery address in this data record. If the total quantity reaches the predetermined reference quantity, the data record is locked against being selected again.

This embodiment of the invention removes the necessity to count in advance whether sufficient bulk postal consignments have been transported to the first sorting system 10 for the purpose of supplying all delivery addresses in the listing with a bulk postal consignment or the relevant required quantity of bulk postal consignments. Instead, the first sorting system 10 automatically establishes whether it has been supplied with sufficient bulk postal consignments.

After a predetermined period, it is established that all posted bulk postal consignments have passed through the first sorting system 10. If, after the bulk postal consignments without delivery address have been posted, this predetermined period has elapsed and not all data records in the listing have yet been locked against being selected, then bulk postal consignments are missing. The quantity of the non-locked data records and possibly the sum of the reference quantities of the non-locked data records provides the quantity of the outstanding bulk postal consignments. The data processing system preferably generates a corresponding message which is sent to the data processing system of the consignor. The consignor can then post further bulk postal consignments.

Conversely, it can occur that a bulk postal consignment without a delivery address passes through the first sorting system 10 and the data processing system establishes that each data record in the listing is locked against being selected. In this case, it is detected that more bulk postal consignments than required were transported to the first sorting system 10. The first sorting system 10 preferably transfers these excess bulk postal consignments out and initiates a return transport, e.g., to the return address which is contained in the description. It is also possible for the data processing system to request further delivery addresses from the consignor or to initiate a procedure by means of which the excess bulk postal consignments are transported to a standard substitute delivery address. This standard substitute delivery address is preferably contained in the description.

Depending on the relevant delivery address, each bulk postal consignment—together with other postal consignments—is transported to a second sorting center which is responsible for the delivery address. The sorting system in the second sorting center determines the delivery address of each postal consignment that is to be processed. Various bulk postal consignments of the batch are generally transported to different second sorting systems.

It would be very time-consuming if not only the first but also the second sorting system reads the delivery address on the postal consignment. For this could require the delivery address to be read and entered manually again. In an embodiment, the first sorting system 10 prints a bar code which represents the delivery address in coded form. The second sorting system reads the bar code and thereby determines the temporarily stored delivery address.

However, the consignor often does not want postal consignments to be equipped with such a bar code, because these would disfigure the postal consignments. Furthermore, an agreement between different postal services providers in the Universal Postal Union (UPU) provides for the first sorting center to refrain from printing a bar code on a postal consignment if the postal consignment will then be transported to a sorting center of another postal services provider. This agreement applies to cross-border postal consignments in particular. For this other postal services provider normally uses a different system of bar codes than the first postal services provider.

A method having the name "Fingerprint" was therefore developed, in which attribute vectors are compared. Such a comparison of attribute vectors is disclosed in DE 4000603 C2, EP 1222037 B1 and WO 2006100357 A1, for example.

The Fingerprint method includes the step in which the first sorting system 10 calculates a current attribute vector from the current image of the postal consignment with the delivery address. This current attribute vector is subsequently referred to as a full current attribute vector, since it is calculated from the current image with delivery address, while the reduced current attribute vector is calculated from the current image without delivery address (the current image after the delivery address has been extracted).

The first sorting system 10 generates a data record respectively for each postal consignment, which data record includes the full current attribute vector and the recognized delivery address. This data record is stored in a central database. The second sorting system again generates a full current attribute vector respectively of each postal consignment which passes through the second sorting system.

The second sorting system determines the delivery address as follows: the generated full current attribute vector is compared with all full current attribute vectors which are stored in the central database. That stored full current attribute vector is identified which is most similar to the full current attribute vector generated by the second sorting system. Each stored current attribute vector, and hence also the most similar attribute vector, belongs to a data record which additionally comprises a delivery address. The second sorting system utilizes the stored delivery address of the most similar attribute vector as a delivery address for the postal consignment.

The above described reduced current attribute vector is utilized in the exemplary embodiment for the purpose of generating the full current attribute vector for the Fingerprint method. As explained above, the reduced current attribute vector describes the current image excluding the field with the delivery address, and the full current attribute vector describes the full current image with delivery address.

In order to calculate the reduced current attribute vector, a grid which omits the delivery address field is preferably placed over the current image. In order to calculate the full current attribute vector, a grid which completely covers the delivery address field is preferably placed over the current image. The full current attribute vector is preferably calculated using the same attributes as the reduced current attribute vector and using the same method.

Calculation results can be reused in this context. For example, taking as a starting point the calculation results for the reduced current attribute vector, a grid is placed over the delivery address field and the analysis of this field is combined with the calculation results which were obtained when calculating the reduced current attribute vector. This produces the full current attribute vector for the full current image.

In a development of this embodiment, use is additionally made of the computer-readable reference image and the computer-readable listing which the consignor sent to the transporter. The second sorting system automatically decides whether the postal consignment that is to be processed belongs to the batch comprising bulk postal consignments or not. This decision is made by the second sorting system in the same way as described above for the first sorting system 10. If the postal consignment that is to be processed belongs to the batch, the second sorting system establishes whether the delivery address that has been determined is entered on the listing or not. If said determined delivery address is not entered, provision is preferably made for searching for further attribute vectors in the data records of the central database. Among the data records that are determined thus, provision is made for searching for a data record which has a delivery address that is present in the listing.

The second sorting system forwards each postal consignment to the delivery address that has been determined in each case. The printed delivery address and possibly the anticipatory disposal are used in order to deliver the bulk postal consignment correctly.

The invention makes it possible automatically to take into consideration quality requirements and anticipatory disposals for the postal consignments of the batch, and nonetheless to process the postal consignments together with the other postal consignments in accordance with an already conventional method. It is not necessary to process and transport the postal consignments of the batch separately from other postal consignments, which would be considerably more costly.

Furthermore, the invention removes the need to print a stamp relating to a transportation charge ("indicia") or an anticipatory disposal ("endorsement") or a quality requirement ("quality of service") on a bulk postal consignment of the batch. This information is contained in the description (if the information applies to all bulk postal consignments) or in the listing (information which only applies to some bulk postal consignments). Only the delivery address need be printed on the postal consignment, if the consignor has not already equipped the postal consignment with the delivery address.

A time period is preferably specified during which all postal consignments of the batch are transported to their respective delivery addresses or returned in accordance with an anticipatory disposal or otherwise processed. This time period begins with the posting of the batch and ends, e.g., eight days later. Only during this time period are current images of postal consignments compared with the reference image. The description with the reference image is deactivated in the central data memory after this time period because no more postal consignments of the batch pass through a sorting system after the end of the time period.

The transporter preferably transports bulk postal consignments from different batches which can originate from different consignors. The postal consignments of a batch are identical, with the exception of the delivery address, while the postal consignments of different batches differ from each other. For example, the different batches contain the copies of different journals or catalogs.

The method is carried out for the postal consignments of the different batches. For each batch, a description of the batch with a reference image is generated and sent to the transporter in each case. Each of these descriptions is activated for a predetermined time period in each case. The time period begins with the posting of the relevant batch. The length of the time period can depend on a generic quality requirement for the batch, in particular on a predetermined maximal transport duration. The current image of a consignment is compared with all reference images of activated descriptions. The data processing system either decides that the postal consignment belongs to exactly one of these batches, and additionally to which it belongs. Or the data processing system decides that the postal consignment does not belong to any of the batches for which a description is available.

The data processing system which is connected to the first or the second sorting system, or another data processing system of the transporter, preferably also generates an invoice or other payment advice which the transporter sends to the consignor.

For this, the data processing system of the transporter uses the computer-readable description of the batch comprising bulk postal consignments. In addition to taking the reference image from this description, the data processing system also takes the identification code of the user, wherein said identification code specifies who placed the order for the transport of the batch comprising bulk postal consignments.

As explained above, the first sorting system 10 determines which of the supplied postal consignments belongs to this batch comprising bulk postal consignments. For this, as described above, it uses the reference image which the consignor sent to the transporter as part of the computer-readable description. Furthermore, the first sorting system 10 determines the quantity of postal consignments in the batch. Moreover, it preferably determines the weight and the dimensions of each bulk postal consignment of the batch.

In order to generate the invoice, the data processing system of the transporter firstly uses the details of the consignor in the description that has been sent. This description contains anticipatory disposals which apply to all bulk postal consignments of the batch. The data processing system preferably checks these details automatically by means of the actual weight and/or the dimensions which are measured in each case. Variations can occur in practice, and postal consignments of the batch can have different weights.

The data processing system secondly analyzes the listing including the delivery addresses and the individual anticipatory disposals, as well as the printed delivery addresses that have been read.

As a result, all details which are required in order to calculate and invoice the transportation charge for transport of the batch are available, specifically:

the identification code and hence the identity of the consignor, the quantity of the postal consignments in the batch, their respective weight and dimensions, the distribution of the delivery addresses over delivery areas, and the generic and individual anticipatory disposals which the transporter was to take into consideration.

Using these details, the data processing system of the transporter generates an invoice for the transport of the bulk postal consignments of the batch and utilizes the details listed above for this purpose. It initiates a transfer of this invoice to the transporter.

In a development, provision is made for automatically determining how long each bulk postal consignment of the batch was transported for. For this, information is measured and stored as follows:

the time point at which the batch was posted, for each bulk postal consignment of the batch, the time point at which this postal consignment was recognized as part of the batch by the data processing system of the first sorting system 10, and for each bulk postal consignment of the batch, the time point at which this postal consignment was recognized as part of the batch by the data processing system of the second sorting system.

From the temporal separations, it is possible to calculate the transport time of each postal consignment and also an average transport time and further statistical details. In particular, it is possible to check whether the transporter actually adhered to a desired transport time which was predetermined by the consignor or not.

What is claimed is:

1. A method for transporting a set of items, wherein each item of the set passes through a sorting system at least once, comprising:

predetermining a destination point for each item of the set and for each further item which passes through the sorting system;

generating for each item which passes through the sorting system a current image of the item from a predetermined viewing direction, the current image showing the destination point of the item;

determining the predetermined destination point of the item;

initiating a transport of the item to the destination point which is determined in each case;

transmitting a computer-readable description of the set from a data processing system of a consignor to a data processing system which is connected to the sorting system, wherein the description includes a reference image of the item from the viewing direction and does not comprehend a destination point; and for each item which passes through the sorting system, automatically deciding by the data processing system whether or not the item belongs to the set, wherein the data processing system compares the generated current image of the item with the reference image; and wherein a plurality of attributes is specified which characterizes an image of an item passing through the sorting system, wherein a current attribute vector is calculated in each case for each item which passes through the sorting system, comprising the values which these attributes assume for the generated current image of the item, and wherein the data processing system calculates a reference attribute vector comprising the values which these attributes assume for the reference image that was sent, calculates a separation between the reference attribute vector and the current attribute vector and, if this separation is greater than a predetermined limit, decides that the item does not belong to the set.

2. The method of claim 1, wherein the description further includes a quality requirement which specifies the transport of the items of the set to their respective destination points and, if an item which is passing through belongs to the set, the sorting system initiates the transport of the item to its respective destination point in accordance with the quality requirement.

3. The method of claim 1, further comprising:

transmitting a computer-readable listing the data processing system, wherein the listing comprises a data record for at least one item of the set, that includes an indicator code of the destination point of the item and an anticipatory disposal for this item, wherein the anticipatory disposal specifies handling of the item if the item cannot be transported to its destination point;

when an item passes through the sorting system, checking by the sorting system checks whether the item is provided with a stamp indicating that the item could not be transported to its destination point, if the sorting system determines that an item which is passing though the sorting system is provided with a stamp indicating that the item could not be transported to its destination point, and the data processing system determines that this item belongs to the set, searching by the data processing system in the listing for a data record including the destination point which is predetermined for the item; and if a data record comprising this destination point is found and said data record comprises an anticipatory disposal, initiating by the sorting system a transport of the item in accordance with the anticipatory disposal that has been found.

4. The method of claim 1, wherein each item to be transported is a postal consignment featuring a surface which is provided or can be provided in each case with a destination point indicator code, and wherein the viewing direction is predetermined such that the surface with the destination point indicator code is visible from the viewing direction.

5. The method of claim 1, wherein every item of the set comprises a cover sheet which is visible from outside and wherein the reference image is created by using an artwork master which is used or usable for printing the cover sheer.

6. The method of claim 1, further comprising:
checking by the sorting system, when an item passes through, whether the item is provided with a stamp indicating that the item could not be transported to its destination point;
if an item is provided with such a stamp and this item belongs to the set, determining by the data processing system whether the description includes an anticipatory disposal, wherein the anticipatory disposal specifies a predetermined handling of the item if the item cannot be transported to its destination point; and
if an anticipatory disposal is as part of the description, initiating by the sorting system a transport of the item that cannot be transported to the destination point in accordance with the anticipatory disposal.

7. The method of claim 6, wherein the description further includes a specification of a substitute destination point which is valid for all items of the set and for an item which could not be transported to the destination point, wherein initiating a transport of this item in accordance with the anticipatory disposal that has been determined comprises:
determining by the sorting system the substitute destination point by analyzing the description; and
initiating a transport of the item to the substitute destination point.

8. The method of claim 6, further comprising:
predetermining a standard anticipatory disposal; and,
if the data processing system determines that the description does not include an anticipatory disposal, initiating by the sorting system a transport of that item, which could not be transported to the destination point, in accordance with the predetermined standard anticipatory disposal.

9. The method of claim 1, wherein at least one item of the set is equipped with an indicator code of the predetermined destination point before it passes through a sorting system for the first time, and wherein determining the destination point for this item comprises determining by the sorting system a destination point indicator code by analyzing the current image.

10. The method of claim 9, further comprising transmitting a computer-readable listing to the data processing system, wherein the listing includes the relevant reference destination point for each item of the set, and wherein the determining of the destination point comprises comparing by the sorting system the destination point indicator code with reference destination points in the listing.

11. The method of claim 1, further comprising:
transmitting a computer-readable listing to the data processing system, wherein the listing comprises a set of reference destination points;
selecting by the data processing system, if it has decided that an item which is passing through belongs to the set, a reference destination point from the listing;
providing the item with an indicator code of the selected reference destination point; and
initiating a transport of the item to this reference destination point.

12. The method of claim 11, further comprising locking by the data processing system, after it has selected a reference destination point from the listing and provided an item of the set with a specification of the selected reference destination point, this reference destination point against being selected again.

13. The method of claim 11, wherein the listing includes, for at least one reference destination point, a reference quantity of items of the set which are to be transported to this reference destination point, and wherein the data processing system counts how many items of the set are equipped with an indicator code for this reference destination point, and, if the counted quantity is equal to the reference quantity in the listing, locks this reference destination point against being selected again.

14. The method of claim 13, further comprising, if all reference destination points in the listing are locked against being selected again and an item of the set passes through the sorting system again, transferring this item out to an indicated output entity.

15. The method of claim 13, further comprising checking by the data processing system whether all reference destination points in the listing are locked against being selected again, and, if at least one reference destination point is not locked, generating a message including a description of all reference destination points that are not locked.

16. The method of claim 1, wherein the generated current image of at least one item which passes through the sorting system includes an image of the destination point with which the item has been provided, wherein the image of the destination point is removed from the generated current image, and wherein for the purpose of deciding whether the item belongs to the set or not, the data processing system compares the current image, from which the destination point image has been removed, with the reference image that was sent.

17. The method of claim 16, wherein each item of the set is provided with its respective destination point in such a way that the current image of the item includes the destination point image at the same position, wherein the sent description includes an indicator code for a position of the destination point image in the relevant current image, and wherein the image of the destination point is removed from the generated current image using the position indicator code.

18. The method of claim 17, wherein each item of the set includes an address block field in which an indicator code for the respective destination point is inserted, wherein the sent description includes an indicator code for a position and dimensions of the address block field, wherein the image of the destination point is removed from the generated current image, and wherein the position indicator code and the dimensions indicator code are utilized for this purpose.

19. The method of claim 1, further comprising counting how many of the items which pass through the sorting system belong to the set according to the decision of the data processing system.

20. The method of claim 19, further comprising determining and storing by the data processing system, for each item which belongs to the set according to the decision of the data processing system, a time point at which this item passes through the sorting system.

21. The method of claim 19, further comprising generating by the data processing system, using the quantity that has been determined and the description that was sent, a computer-readable log of the procedure by means of which the items of the set were transported.

* * * * *